United States Patent
Horst et al.

(10) Patent No.: US 9,347,303 B2
(45) Date of Patent: May 24, 2016

(54) PRODUCED FLUID HEATING AND SEPARATION

(75) Inventors: Jason Horst, Madisonville, LA (US);
Keith Doucet, Mandeville, LA (US)

(73) Assignee: AMCOL INTERNATIONAL CORPORATION, Hoffman Estates, IL (US)

( * ) Notice: Subject to any disclaimer, the term of this patent is extended or adjusted under 35 U.S.C. 154(b) by 843 days.

(21) Appl. No.: 13/424,937

(22) Filed: Mar. 20, 2012

(65) Prior Publication Data

US 2012/0255916 A1 Oct. 11, 2012

Related U.S. Application Data

(60) Provisional application No. 61/473,433, filed on Apr. 8, 2011.

(51) Int. Cl.
*E21B 43/34* (2006.01)

(52) U.S. Cl.
CPC ..................... *E21B 43/34* (2013.01)

(58) Field of Classification Search
None
See application file for complete search history.

(56) References Cited

U.S. PATENT DOCUMENTS

| | | | | |
|---|---|---|---|---|
| 2,506,412 A | * | 5/1950 | Chausse | 137/209 |
| 3,833,059 A | | 9/1974 | Sisson | |
| 4,190,205 A | * | 2/1980 | Mitchell | 239/129 |
| 4,197,712 A | * | 4/1980 | Zwick et al. | 62/50.3 |
| 4,372,386 A | * | 2/1983 | Rhoades et al. | 166/300 |
| 4,409,927 A | * | 10/1983 | Loesch et al. | 122/26 |
| 4,641,710 A | * | 2/1987 | Klinger | 166/400 |
| 5,215,454 A | | 6/1993 | Ferramola et al. | |
| 5,335,728 A | | 8/1994 | Strahan | |
| 5,567,318 A | | 10/1996 | Beall | |
| 5,656,136 A | * | 8/1997 | Gayaut et al. | 166/302 |
| 5,670,435 A | | 9/1997 | Kajita | |
| 5,695,643 A | * | 12/1997 | Brandt et al. | 210/652 |
| 5,922,206 A | | 7/1999 | Darlington, Jr. et al. | |
| 5,935,444 A | | 8/1999 | Johnson et al. | |
| 5,988,280 A | | 11/1999 | Crawford et al. | |
| 6,032,732 A | * | 3/2000 | Yewell | 166/57 |
| 6,073,695 A | | 6/2000 | Crawford et al. | |
| 6,235,201 B1 | | 5/2001 | Smith et al. | |
| 6,358,422 B1 | | 3/2002 | Smith et al. | |
| 6,398,951 B1 | | 6/2002 | Smith et al. | |
| 6,398,966 B1 | | 6/2002 | Smith et al. | |

(Continued)

FOREIGN PATENT DOCUMENTS

GB 2489815 A * 10/2012

OTHER PUBLICATIONS

Bostick et al., Characterization of soluble organics in produced water, Oak Ridge National Laboratory (Jan. 2002).

(Continued)

*Primary Examiner* — Robert James Popovics
(74) *Attorney, Agent, or Firm* — Squire Patton Boggs (US) LLP

(57) ABSTRACT

An apparatus and method for heating produced fluid from a well, the heating apparatus comprising a produced fluid pathway; a heat generation system comprising a diesel engine, a heated hydraulic fluid pathway, and an engine coolant pathway; and a heat transfer system disposed between the produced fluid pathway and the heat generation system to transfer thermal energy from the heat generation system to a produced fluid contained within the produced fluid pathway.

17 Claims, 11 Drawing Sheets

(56) References Cited

U.S. PATENT DOCUMENTS

| | | | |
|---|---|---|---|
| 6,409,924 B1 | 6/2002 | Johnson et al. | |
| 6,415,866 B1* | 7/2002 | Baugh | 166/304 |
| 6,749,757 B2 | 6/2004 | Smith et al. | |
| 6,893,615 B1* | 5/2005 | Alexander | 422/177 |
| 7,297,279 B2 | 11/2007 | Johnson et al. | |
| 7,445,761 B1* | 11/2008 | Alexander | 423/212 |
| 7,703,528 B2* | 4/2010 | Schultz et al. | 166/302 |
| 7,765,794 B2* | 8/2010 | Alexander | 60/285 |
| 8,371,251 B2* | 2/2013 | Frick | 122/406.1 |
| 8,534,235 B2* | 9/2013 | Chandler | 122/276 |
| 2011/0005757 A1 | 1/2011 | Hebert | |
| 2012/0255916 A1* | 10/2012 | Horst et al. | 210/774 |
| 2013/0126174 A1* | 5/2013 | Henson et al. | 166/308.1 |

OTHER PUBLICATIONS

Heat Transfer Fluid, Duratherm Heat Transfer Fluids (publicly available before Apr. 8, 2011).

Heat Transfer Fluids product sheet, Dynalene Inc., (Oct. 2008).

Home page of website for Dynalene Inc. (Oct. 2008).

Search Report from the United Kingdom Intellectual Property Office for corresponding application No. GB1206057.0 (dated Jul. 12, 2012).

Separation & Separators—Separator Functions, downloaded from the Internet at: <<http://articles.compressionjobs.com/articles/oilfield-101/1008-separation-separators-well-fluid-coalescing> (written Jan. 26, 2010, last updated Feb. 24, 2010).

* cited by examiner

PRODUCED FLUID HEATING AND SEPARATION

CROSS-REFERENCE TO RELATED APPLICATION

The benefit under 35 U.S.C. §119(e) of U.S. Provisional Patent Application No. 61/473,433, filed Apr. 8, 2011, is hereby claimed, and the disclosure is incorporated herein by reference.

FIELD OF DISCLOSURE

The present invention is directed to an apparatus and method for efficiently and safely heating produced fluids, e.g., comprising hydrocarbons and water, using a heat transfer system that separates the direct-heat from an engine from the hydrocarbons in the produced fluid. More particularly, work and heat from the engine is directed into heat exchangers where it heats a heat transfer fluid, that transfers heat to a produced fluid heat exchanger, which heats the produced fluids, e.g., so that hydrocarbons can be separated from produced water by helping break a hydrocarbon/water emulsion. In a preferred embodiment, the apparatus is a self-contained, portable unit that is able to be moved into position, operated, and then removed, for example from an offshore oil platform.

BACKGROUND

Oil and gas wells are drilled into the earth and reach a subterranean reservoir so that liquid and gaseous hydrocarbons can be recovered from the reservoir. Eventually, the gas and liquid hydrocarbons are separated into various fractions for use as gasoline, petrochemicals, asphalt, waxes, and the like, at a refinery.

A number of patents disclose the use of a diesel engine to heat a chemical solution before injecting the chemical solution into a well bore and for injecting engine heat into the well bore for improving the recovery of hydrocarbons from the well, e.g., see U.S. Pat. Nos. 6,073,695 and 3,833,059.

Produced fluids are water based fluids recovered from a oil or gas well, and are often contaminated with hydrocarbons. The hydrocarbons prevent direct disposal of the produced fluids. Therefore, separators are often installed in attempts to reduce the hydrocarbon content in the produced fluid.

The hydrocarbon content of the produced fluid includes highly combustible materials, for example, $C_6$-$C_{10}$ hydrocarbons, $C_{10}$-$C_{20}$ hydrocarbons and $C_{20}$-$C_{28}$ hydrocarbons.

The apparatus and method described herein are directed toward heating the produced fluid after removal from the well. The heating can be one step in the separation of contaminants, e.g., particulates, or hydrocarbons, from the produced fluid.

SUMMARY

The apparatus and methods described herein improve the on-site separation of hydrocarbons from the produced fluids of a well bore by efficiently and safely separating the direct-heat from an engine and the hydrocarbons in the produced fluids while significantly increasing the temperature of the produced fluids. Energy (heat) from the engine is exchanged with a non-combustible heat transfer fluid that then transfers heat to the produced fluids. In one embodiment, the apparatus operates at the well site, e.g., an offshore oil platform.

It should be noted that direct heat transfer between the diesel engine gas exhaust and/or water exhaust does not occur in the apparatus and methods described herein. It has been found that a primary heat transfer step between the diesel engine gas exhaust and/or water exhaust must occur with a heat transfer fluid in order to properly control the temperature of the recovered hydrocarbons in order to avoid hydrocarbons flashing and potential explosions. The apparatus and methods described herein utilize only the heat produced by a diesel engine for heating and separating the recovered hydrocarbons.

BRIEF DESCRIPTION OF THE DRAWING FIGURES

DETAILED DESCRIPTION

The apparatus and methods described herein may be understood more readily by reference to the following detailed description and the figures provided. It is to be understood that this invention is not limited to the specific components, articles, processes and/or conditions described, as these may, of course, vary. It is also to be understood that the terminology used herein is for the purpose of describing particular embodiments only and is not intended to be limiting.

In one embodiment, the apparatus and methods described herein are adaptable for placement and use on an offshore oil platform. For example, the apparatus can be sufficiently self-contained such that the apparatus can be transferred from a first location (e.g., a onshore storage site) to the offshore oil platform. The transfer can be, for example, by a watercraft or aircraft. Importantly, the apparatus conforms to the safety requirements common on offshore oil platforms, these include but are not limited to no open flame and non-sparking. In offshore oil platform use, the method can include those features provided below as well as, transporting the apparatus to the oil platform, attaching the apparatus to a produced fluid source, attaching the apparatus to a treated water output conduit, treating as a batch-process the produced fluid from an oil or gas well, or removing the apparatus from the oil platform.

As described herein, the separation of hydrocarbon contaminants and water is facilitated by raising the temperature of the hydrocarbon contaminated water. Herein, in one embodiment, is an apparatus, a produced fluid heating apparatus, for heating the produced fluid from a gas or oil well. Produced fluids includes the produced water from the well. Produced water includes the completion fluids used during the drilling, workover, and completion of a well. The produced water can be understood to include, for example, hydrocarbon contaminated water received directly from the well, water received from a production facility, or water received from a storage container. The separation of the hydrocarbons from the produced water yields processed water that contained a lower hydrocarbon concentration or content.

Figure 1:
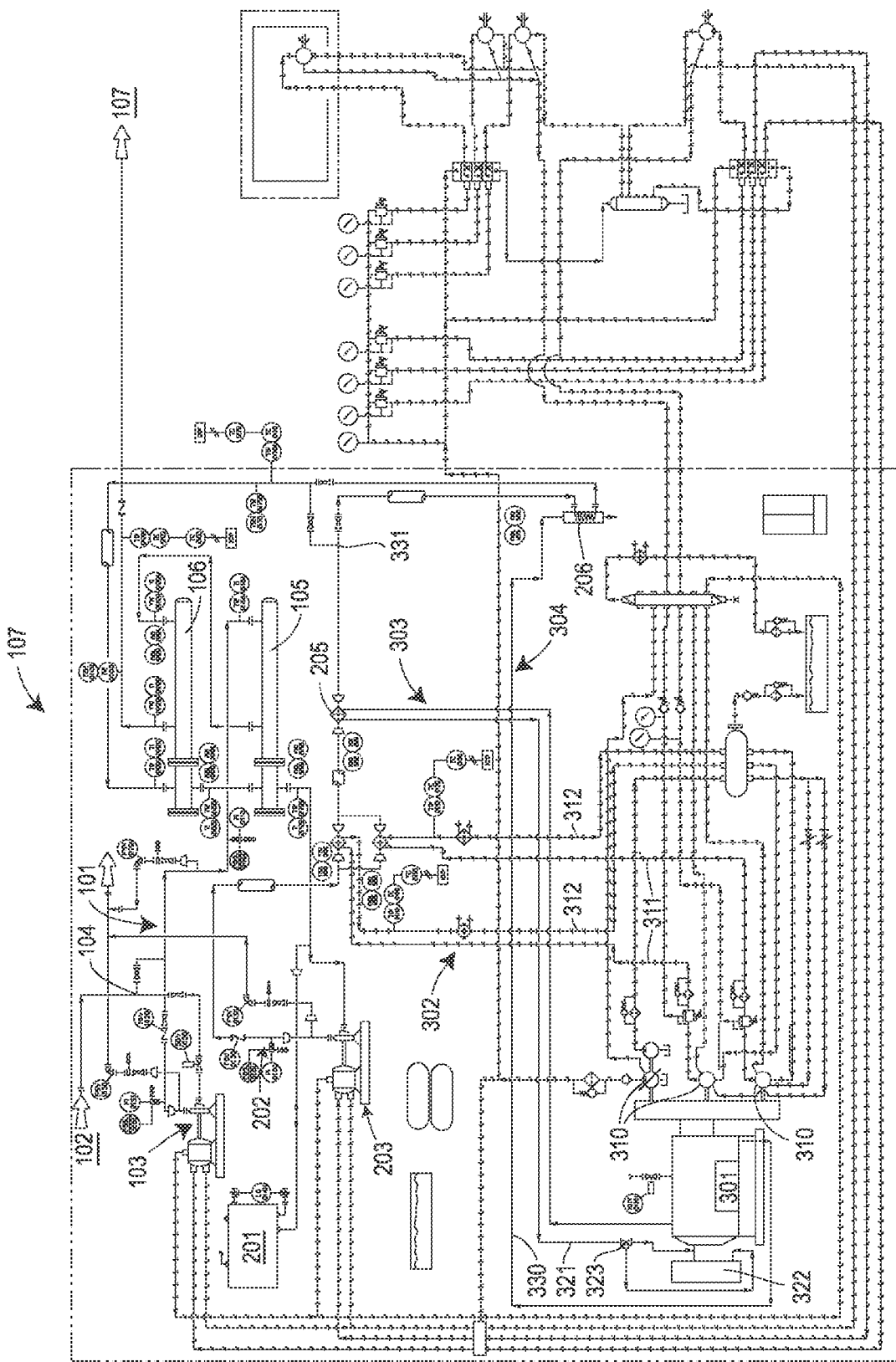
FIG. 1 is a process flow schematic of the embodiment of the present disclosure presented in FIGS. 2-11.
Figure 2:
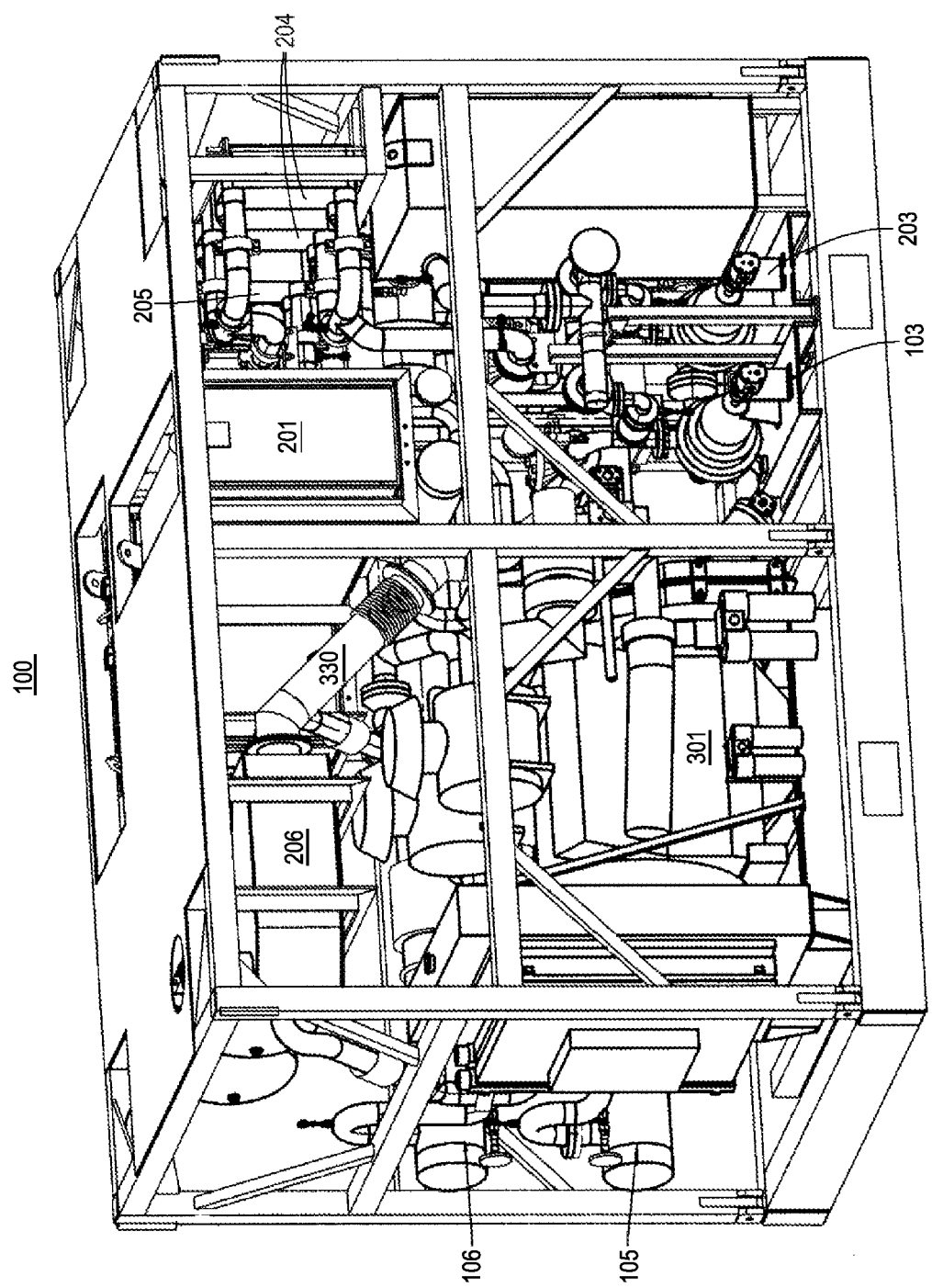
FIG. 2 is a perspective view of one embodiment of the present disclosure.
Figure 3:
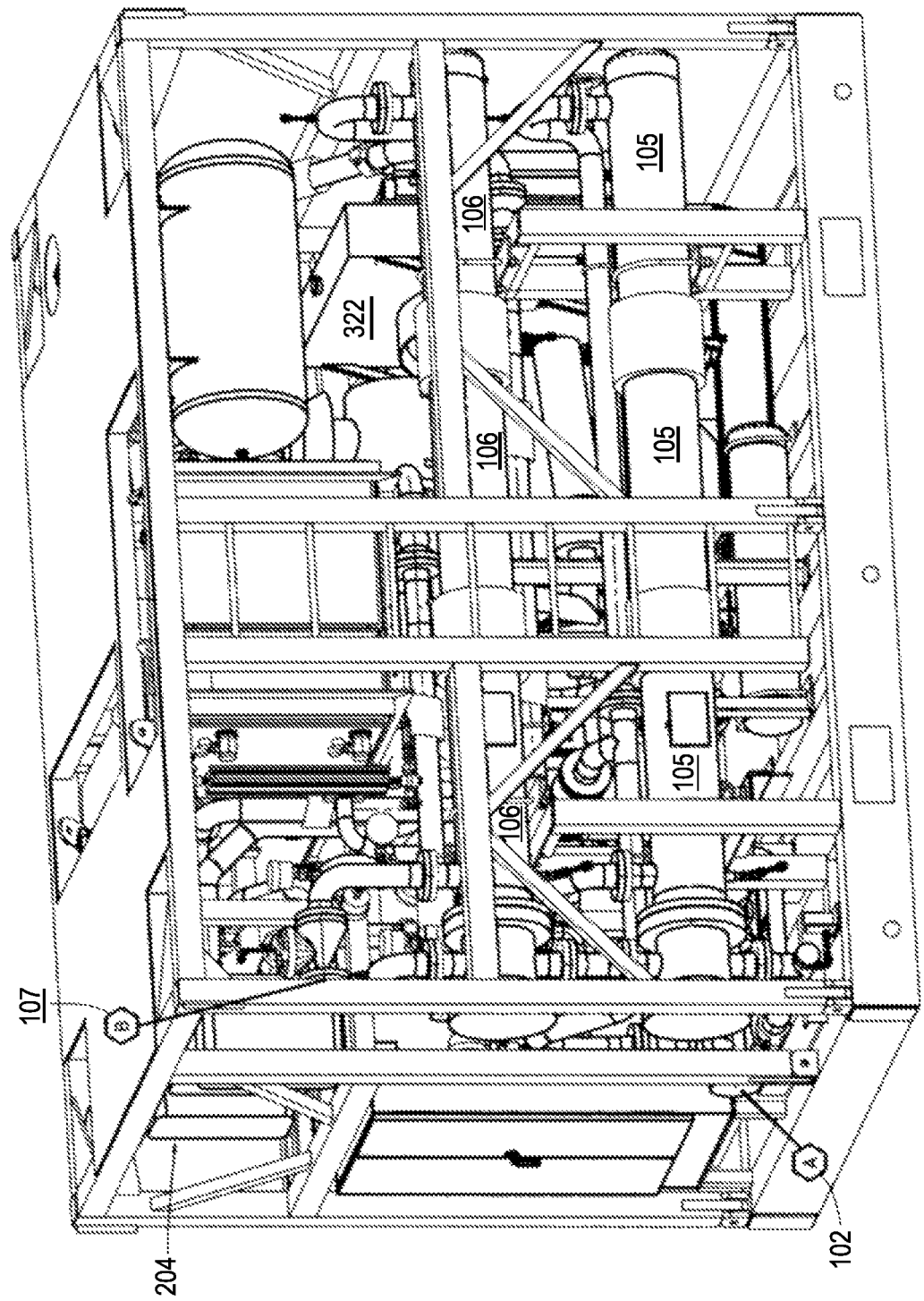
FIG. 3 is a perspective view of one embodiment of the present disclosure.
Figure 4:
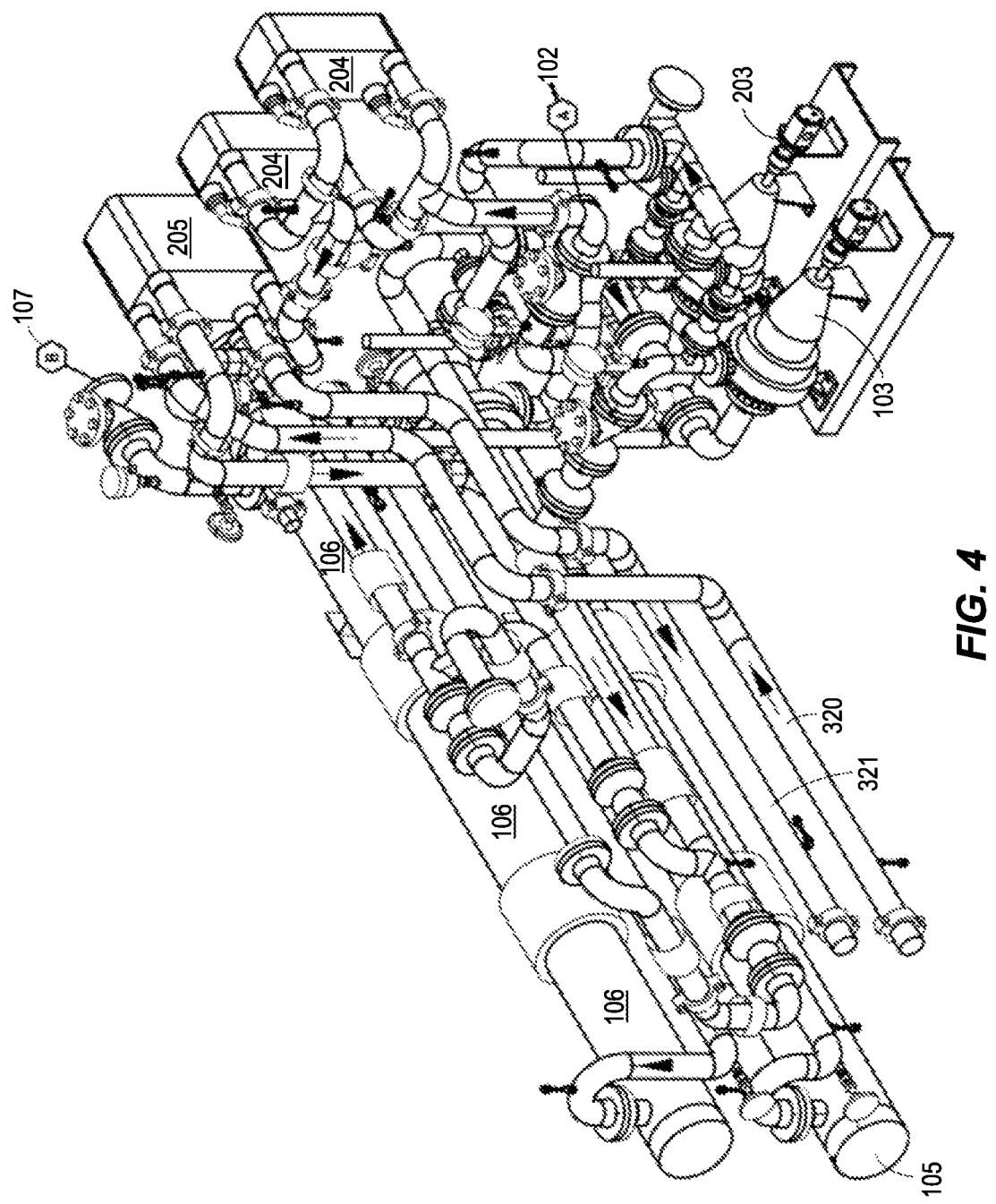
FIG. 4 is an internal view of one embodiment of the present disclosure wherein multiple features have been removed to show internal structure.
Figure 5:
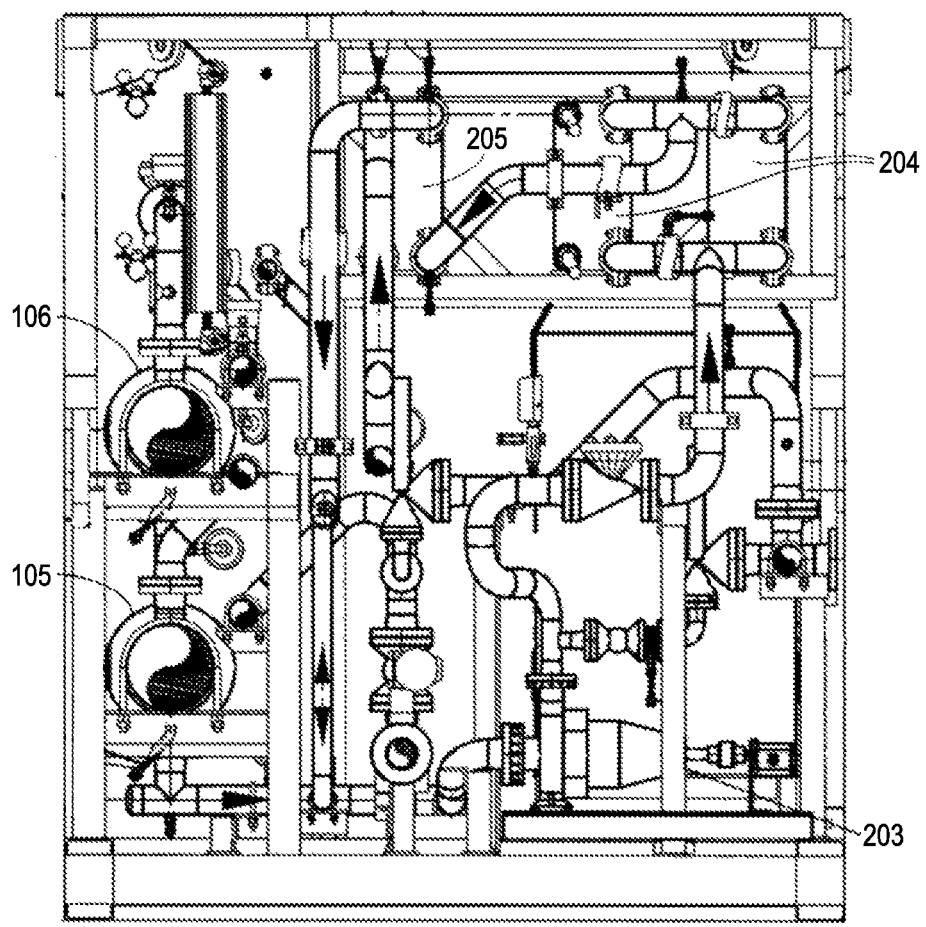
FIG. 5 is an internal cross-sectional view of a first end of the embodiment shown in FIGS. 2 and 3.
Figure 6:
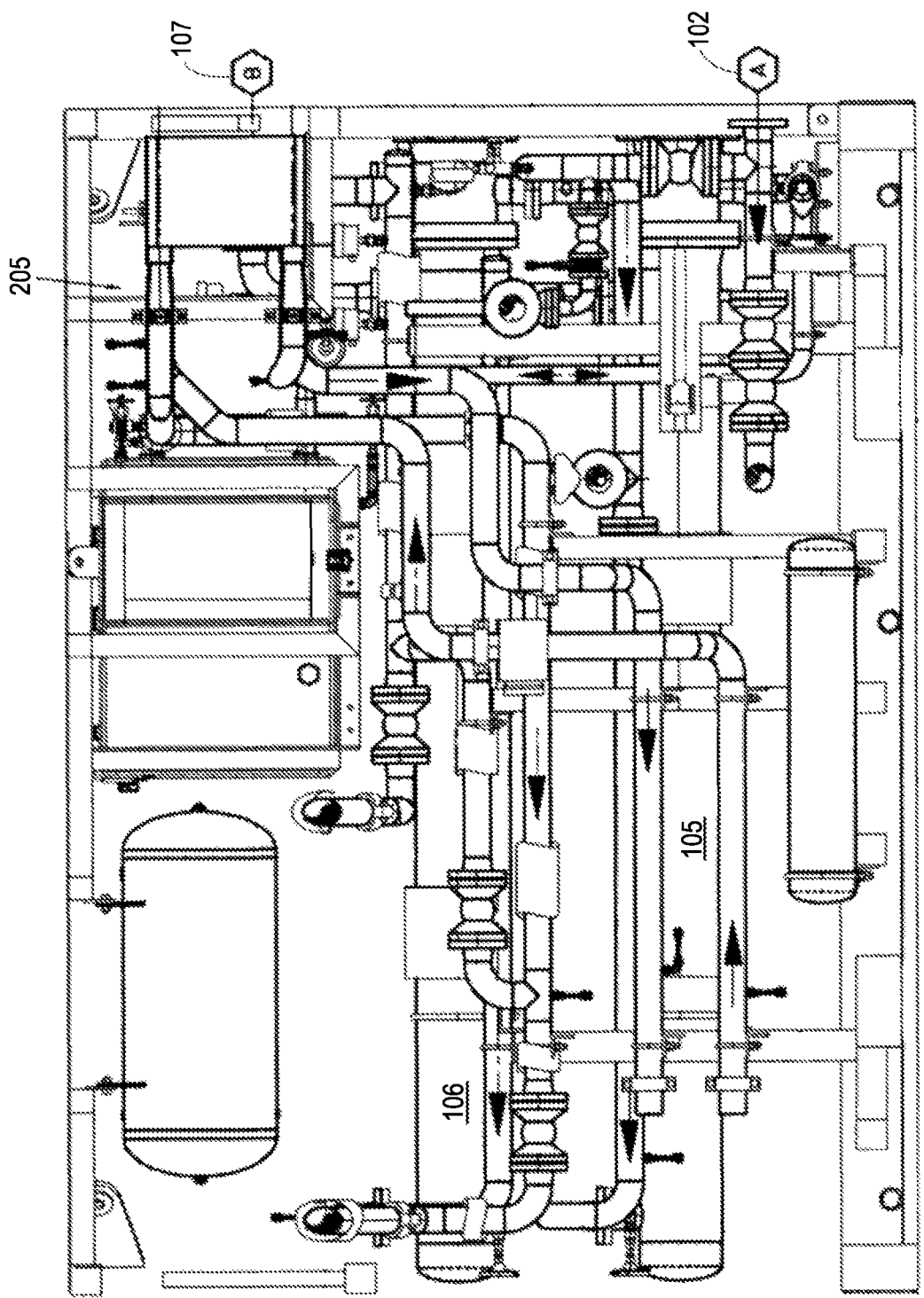
FIG. 6 is an internal cross-sectional view of a first side of the embodiment shown in FIGS. 2 and 3.
Figure 7:
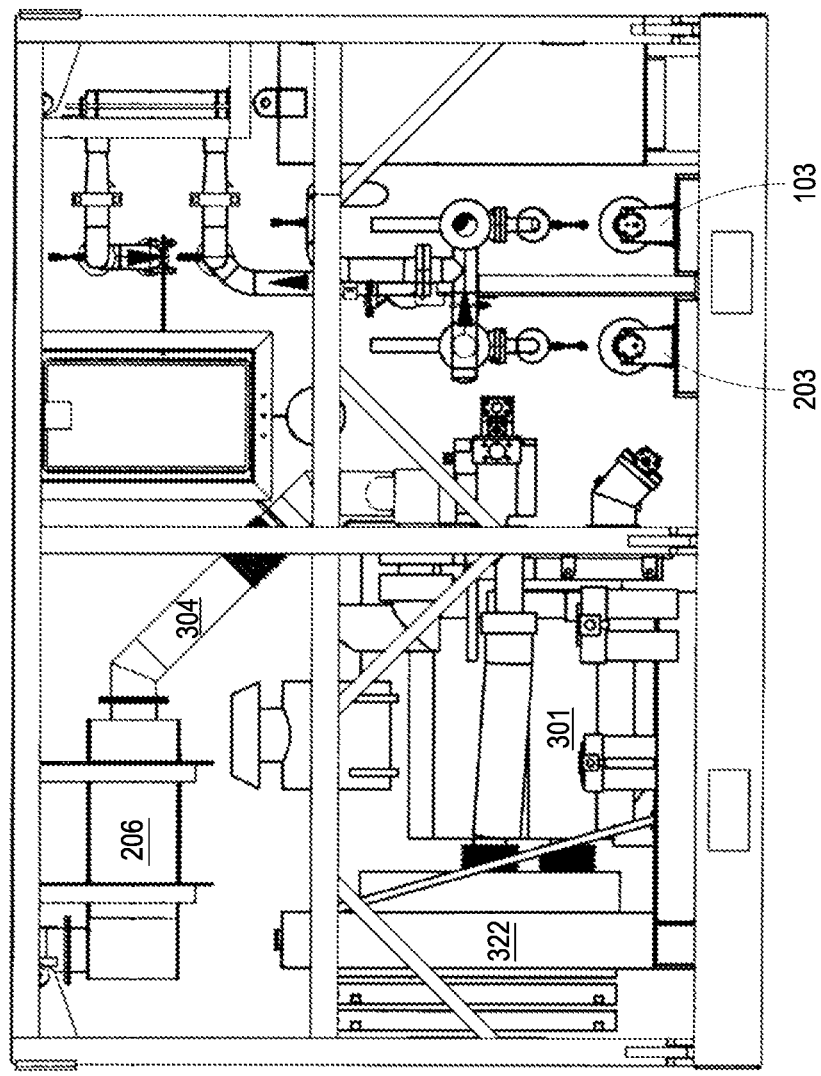
FIG. 7 is an internal cross-sectional view of a second side of the embodiment shown in FIGS. 2 and 3.
Figure 8:
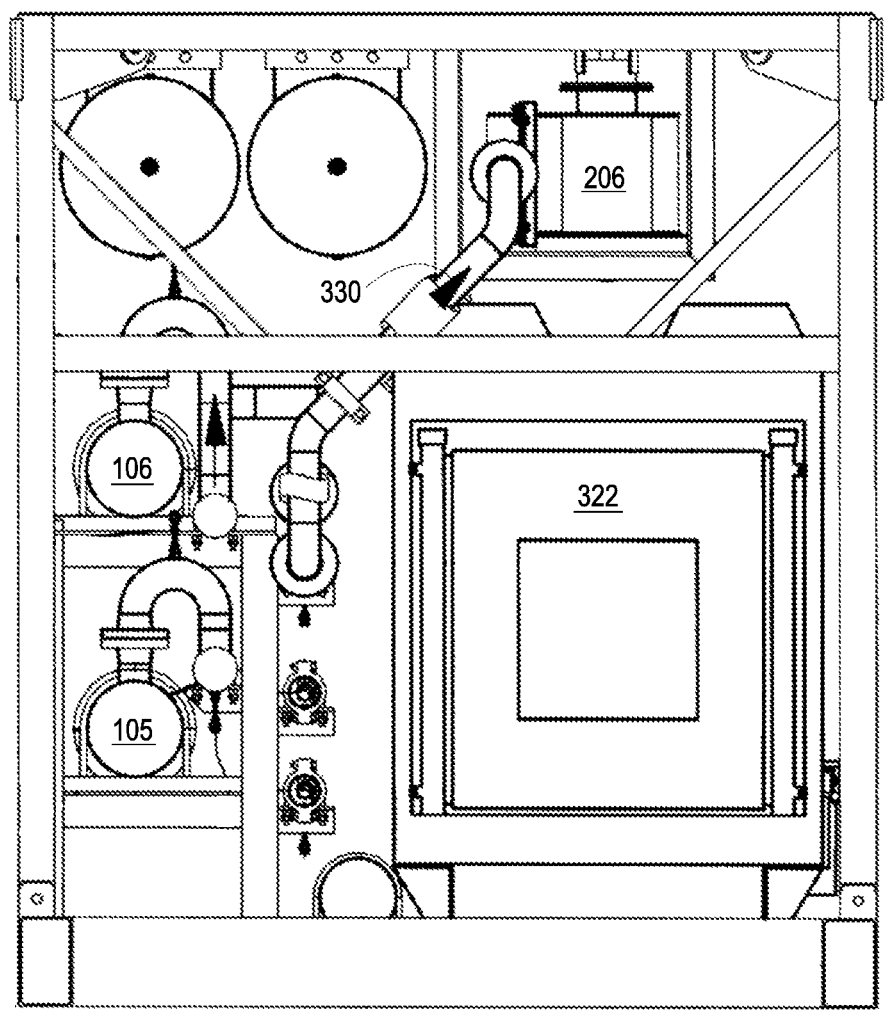
FIG. 8 is an internal cross-sectional view of a second end of the embodiment shown in FIGS. 2 and 3.
Figure 9:
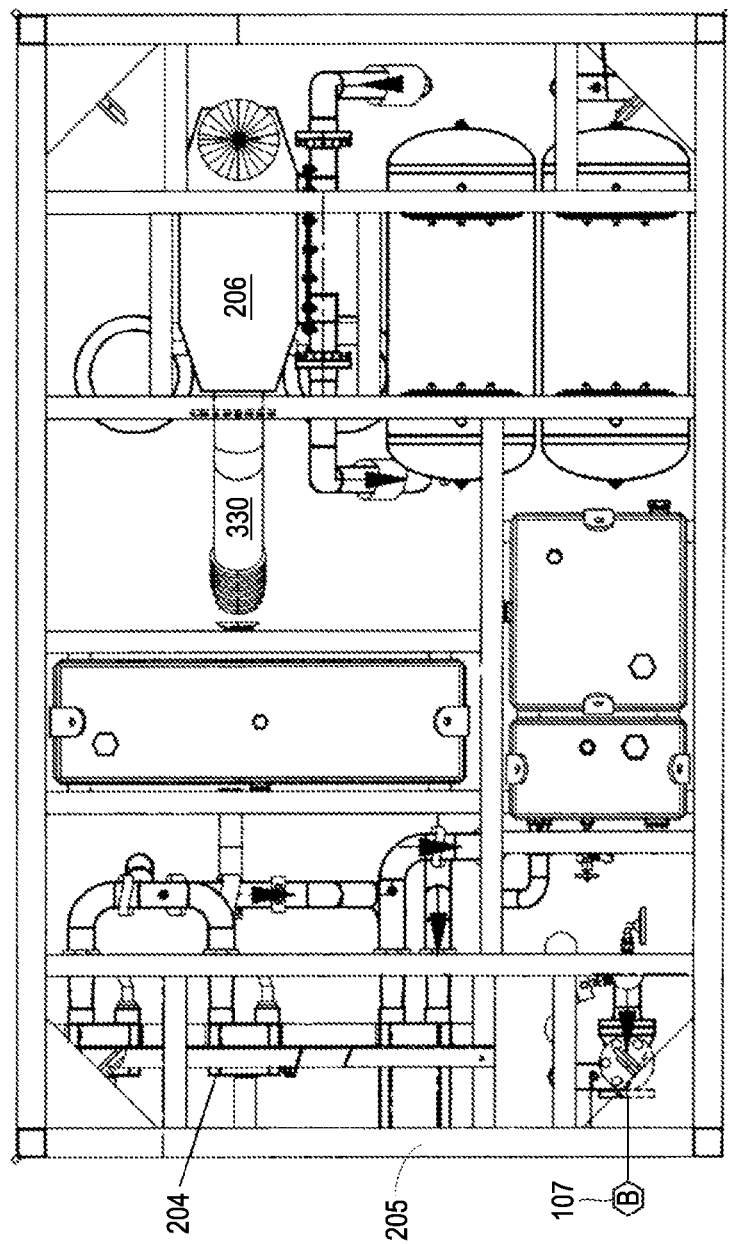
FIG. 9 is a top-down view (upper piping plan) of one embodiment of the present disclosure.
Figure 10:
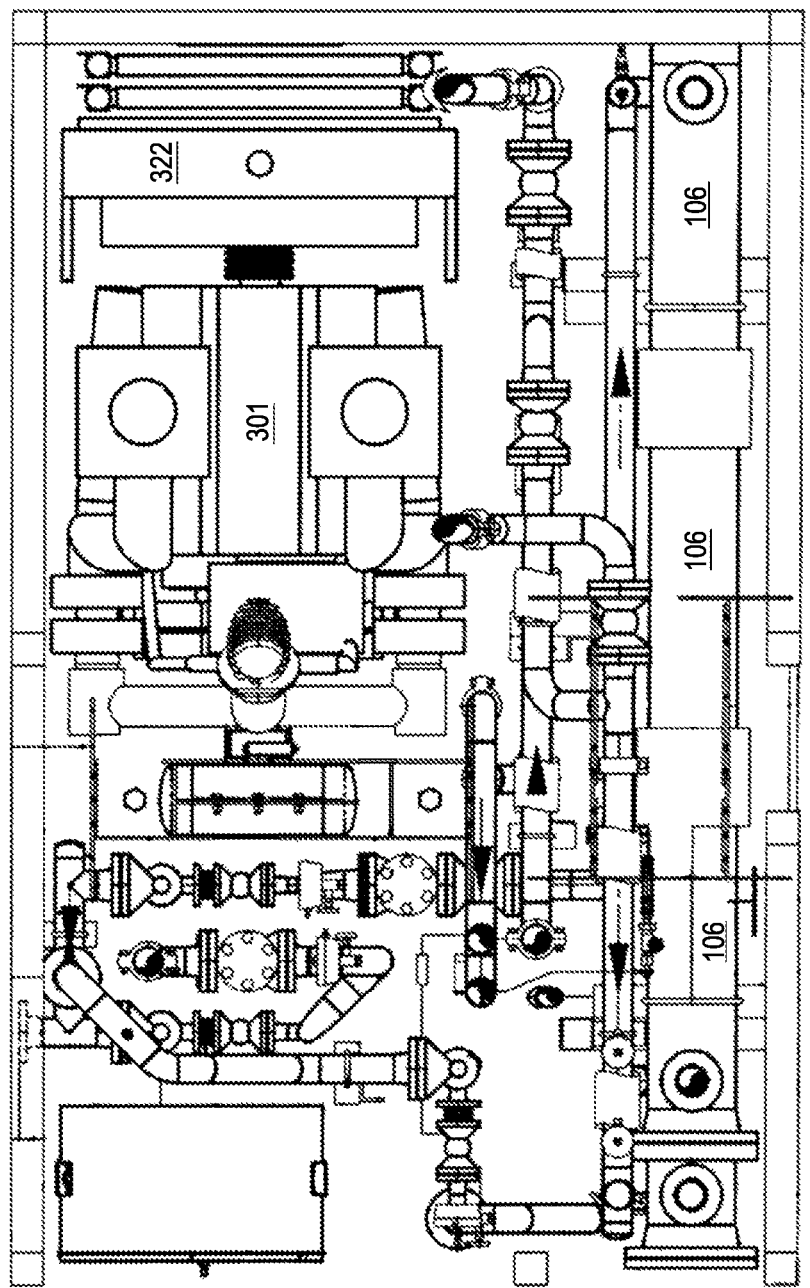
FIG. 10 is an internal top-down cross-sectional view (intermediate piping plan) of the embodiment shown in FIG. 9.
Figure 11:
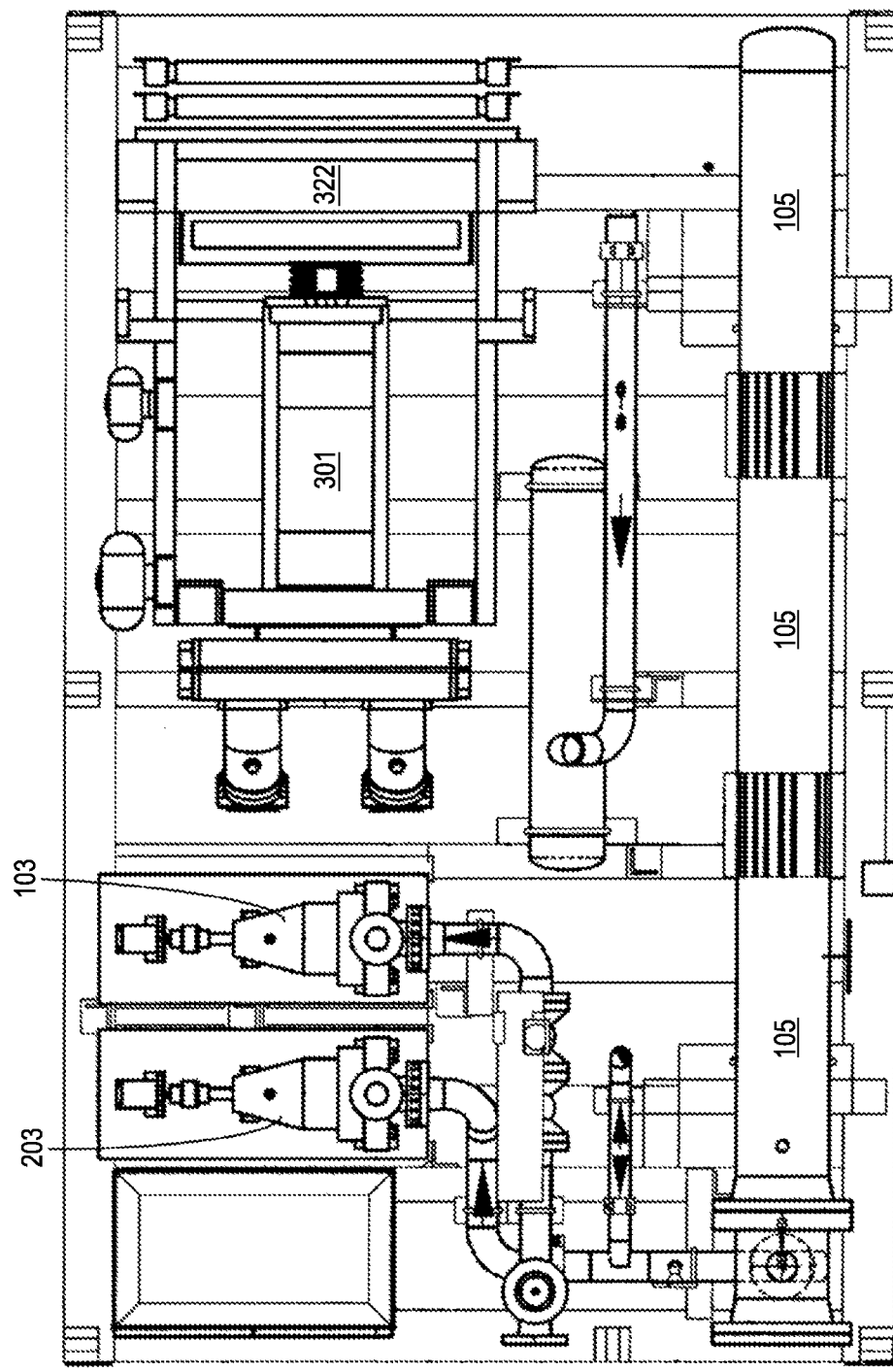
FIG. 11 is an internal top-down cross-sectional view (lower piping plan) of the embodiment shown in FIG. 9.

With reference to FIGS. 1 to 11 various embodiments of the present disclosure are herein presented. FIG. 1 is a schematic representation of the flow pathways, heat exchangers, pumps, engine, and conduits of the present disclosure. FIGS. 2 to 11 are various perspectives and representations of an apparatus that conforms to the present disclosure. Scale and distances are presented in some figures, these are presented as one embodiment of the present disclosure.

The produced fluid heating apparatus 100 includes a produced fluid pathway 101 through which the produced fluid can flow. The produced fluid pathway includes a produced fluid inlet 102, a produced fluid pump 103, a produced fluid pump by-pass 104, at least one (a first) produced fluid heat exchanger 105, and a produced fluid outlet 107. In one embodiment, the produced fluid pathway includes a plurality of produced fluid heat exchangers, for example the pathway can include a second produced fluid heat exchanger 106.

The produced fluid heating apparatus 100 further includes a heat generation system 300 that provides the thermal energy for heating the produced water. The heat generation system 300 can include a diesel engine 301, a heated hydraulic fluid pathway 302, and an engine coolant pathway 303. In one embodiment, the heat generation system 300 includes an engine exhaust pathway 304.

The heated hydraulic fluid pathway 302 provides a recirculating loop through which hydraulic fluid can flow. The heated hydraulic fluid pathway 302 can include a hydraulic pump 310, a hydraulic heat delivery conduit 311, the hydraulic heat exchanger 204, and a hydraulic return conduit 312. The heat generation system can further include a plurality of heated hydraulic fluid pathways 302, for example, the system can include two heated hydraulic fluid pathways 302. In one embodiment, the heated hydraulic fluid pathway 302 can include a plurality of hydraulic heat exchangers 204. In one embodiment, the hydraulic heat exchanger(s) 204 is a plate and frame heat exchanger.

The engine coolant pathway 303 provides a recirculating loop through which engine coolant can flow. The engine coolant pathway 303 can include an engine heat delivery conduit 320, an engine coolant heat exchanger 205, and an engine coolant return conduit 321. In one embodiment, the engine coolant pathway includes a radiator 322. In another embodiment, the engine coolant pathway includes a radiator by-pass 323. Typically, the diesel engine 301 includes a water pump that provides the flow for the engine coolant but a water pump external to the diesel engine 301 can be included. In one embodiment, the engine coolant heat exchanger 205 is a plate and frame heat exchanger.

The engine exhaust pathway 304 is the flow path through which the combustion exhaust flows. The engine exhaust pathway 304 can include an engine exhaust conduit 330 and an engine exhaust heat exchanger 206. In one embodiment, the engine exhaust heat exchanger 206 is a coil type heat exchanger. In another embodiment, the engine exhaust pathway 304 includes a muffler and, optionally, a spark arrestor.

The produced fluid heating apparatus 100 further includes a heat transfer system 200 disposed between the produced fluid pathway 101 and the heat generation system 300. The heat transfer system 200 can transfer the thermal energy from the heat generation system 300 to a produced fluid contained within the produced fluid pathway 101. The heat transfer system 200 can include a heat transfer fluid 201 within an insulated, closed-loop heat transfer fluid pathway 202. The heat transfer fluid preferably has a boiling point above about 100° C., for example, the heat transfer fluid can be ethylene glycol, propylene glycol, polyalkylene glycol, DOWTHERM products (DOW CORNING CORP. Midland, Mich. USA), SYLTHERM products (DOW CORNING CORP. Midland, Mich. USA), PARATHERM products (PARATHERM CORP. West Conshohocken, Pa. USA), mixtures thereof, and mixtures thereof with water. The heat transfer fluid pathway 202 provides a recirculating loop through which the heat transfer fluid 201 can flow. The heat transfer fluid pathway 202 can include a heat transfer fluid pump 203, at least one (a first) hydraulic heat exchanger 204, an engine coolant heat exchanger 205, and a (first) produced fluid heat exchanger 105.

In one embodiment, the heat transfer fluid pathway 202 includes a second produced fluid heat exchanger 106. The second produced fluid heat exchanger 106 is disposed between and fluidly connected to, on the produced fluid pathway 101, the first produced fluid heat exchanger 105 and the produced fluid outlet 107. In another embodiment, the flow of the heat transfer fluid through the heat transfer fluid pathway 202 fluidly connects to the second produced fluid heat exchanger 106 then the first produced fluid heat exchanger 105. In one embodiment, the produced fluid heat exchanger (105 and/or 106) can be a shell and tube heat exchanger.

In one embodiment, the heat transfer fluid pathway 202 includes a plurality of hydraulic heat exchangers 204. For example, a first and a second hydraulic heat exchanger 204 can be arranged in-line or in-parallel along the heat transfer fluid pathway 202.

In an embodiment that includes the engine exhaust heat exchanger 306, the heat transfer fluid pathway 202 can includes an engine exhaust heat exchanger by-pass 331.

In another embodiment, the apparatus described herein can be used to heat produced water to a temperature sufficient for separation of contaminants from the water. Typically, the temperature of the (supplied) produced water can be increased by 20° C. to 60° C., 30° C. to 50° C., 30° C., 35° C., 40° C., 45° C., or 50° C. For example, the temperature of the produced water can be increased to 40, 45, 50, 55, 60, 65, 70, 75, or 80° C.

In one embodiment, a method of separating hydrocarbons from water and providing processed water that comprises a hydrocarbon content less than 50 ppm, 40 ppm, 30 ppm, or 29 ppm includes treating produced water that has a hydrocarbon content greater than 100 ppm, 150 ppm, 200 ppm, 250 ppm, 300 ppm, or 350 ppm with the produced fluid heating apparatus 100 described herein. This method can include providing the produced fluid heating apparatus 100 (e.g., the diesel engine 301, the produced fluid pathway 101, the heated hydraulic fluid pathway 302, the engine coolant pathway, 303, the engine exhaust pathway 304, and the heat transfer fluid pathway 202) and produced water that has a hydrocarbon content greater than 100 ppm and a temperature less than about 50° C. Then channeling the produced water (e.g., from a well bore, a production facility, or a storage tank) to the first produced fluid heat exchanger 105 and through the produced fluid outlet 107 to a water treatment apparatus. Herein, channeling means conducting a flow within a pipe or similar conduit. The method can further include heating the first produced fluid heat exchanger 105 to a temperature in the range of 50° C. to 100° C. with a heat transfer fluid 201; circulating the heat transfer fluid 201 in the heat transfer fluid pathway 202 as described herein. The method can further include circulating hydraulic fluid through the heated hydraulic fluid pathway 302 as described herein. The method can further include circulating engine coolant through an engine coolant pathway 303 as described herein.

In one embodiment, the produced water is supplied at a rate of at least 40, 50, 60 70, or 80 gallons per minute.

In an embodiment, the method can include channeling the produced water from the first produced fluid heat exchanger 105 to a second produced fluid heat exchanger 106 then through the produced fluid outlet 107 to the water treatment apparatus. The second produced fluid heat exchanger 106 can be heated to a temperature in the range of 50° C. to 100° C. with the heat transfer fluid 201.

In an embodiment, the heat transfer fluid pathway 302 comprises a second hydraulic heat exchanger 204. The first and the second hydraulic heat exchangers 204 can be arranged in-line or in-parallel along the heat transfer fluid pathway 202.

In another embodiment, the produced fluid outlet 107 is fluidly connected to a water treatment apparatus. The water treatment apparatus is a means for separating hydrocarbons from water. The water treatment apparatus can be selected from an API oil-water separators, a centrifugal oil-water separator, a weir box, a surge tank, a pressurized or an atmospheric separator, a filtering vessel, a polishing vessel, or any vessel that will provide sufficient residence time for the separation of a non-emulsified hydrocarbon/water combination. Herein, the water treatment apparatus can be an apparatus as described in the following co-owned U.S. Pat. Nos. 7,297,279; 6,749,757; 6,409,924; 6,398,966; 6,398,951; 6,358,422; 6,235,201; 5,935,444; 5,922,206; 5,670,435; 5,567,318, each incorporated herein by reference in their entirety. In one embodiment, the water treatment apparatus can include a Hi-Flow Oil Removal System (AMCOL Int'l), and/or a CRUDESORB system, containing an organophilic clay (CETCO Oilfield Services), as disclosed in one or more of the above referenced U.S. Patents.

In the methods and apparatus described herein, the diesel engine can drive the heat transfer fluid pump, for example, by providing a hydraulic flow by way of a hydraulic pump to the heat transfer fluid pump. The heat transfer fluid pump can be for example, a hydraulic driven centrifugal pump (ACE PUMP Corp., Memphis Tenn.).

In an embodiment, the heat transfer fluid pathway 202 can include an engine exhaust heat exchanger 206 and a by-pass to the engine exhaust heat exchanger 331. The method can then include conducting engine exhaust through an engine exhaust pathway 304 that includes an engine exhaust conduit 330 and the engine exhaust heat exchanger 206.

The foregoing written description provides examples of structure and function representative of the present invention, but not intended to limit the scope beyond that which is recited in the appending claims.

What is claimed:

1. A produced fluid heating apparatus comprising:
    a produced fluid pathway comprising a produced fluid inlet fluidly connected to a produced fluid pump and to a produced fluid pump by-pass, the produced fluid pump and the produced fluid pump by-pass fluidly connected to a first produced fluid heat exchanger, the first produced fluid heat exchanger fluidly connected to a produced fluid outlet;
    a heat generation system comprising a diesel engine, a heated hydraulic fluid pathway, and an engine coolant pathway;
    the heated hydraulic fluid pathway comprising a hydraulic pump fluidly connected to a hydraulic heat delivery conduit, the hydraulic heat delivery conduit fluidly connected to at least one hydraulic heat exchanger fluidly connected to a hydraulic return conduit;
    the engine coolant pathway comprising an engine heat delivery conduit fluidly connected to an engine coolant heat exchanger, the engine coolant heat exchanger fluidly connected to an engine coolant return conduit, the engine coolant return conduit fluidly connected to a radiator and the diesel engine; and
    a heat transfer system disposed between the produced fluid pathway and the heat generation system to transfer thermal energy from the heat generation system to a produced fluid contained within the produced fluid pathway, the heat transfer system comprising a heat transfer fluid disposed within an insulated, closed-loop heat transfer fluid pathway connected to the at least one heated hydraulic heat exchanger to allow transfer of thermal energy from the heated hydraulic fluid pathway to the produced fluid pathway, and the insulated closed-loop heat transfer fluid pathway connected to the engine coolant heat exchanger to allow transfer of thermal energy from the engine coolant pathway of the heat generation system to the produced fluid pathway;
    the heat transfer fluid pathway comprising a heat transfer fluid pump that provides a heat transfer fluid flow direction, the heat transfer fluid pathway further fluidly connected to the at least one hydraulic heat exchanger, an engine coolant heat exchanger, and the first produced fluid heat exchanger.

2. The apparatus of claim 1 further comprising a second produced fluid heat exchanger disposed between and fluidly connected to the first produced fluid heat exchanger and the produced fluid outlet.

3. The apparatus of claim 2, wherein the heat transfer fluid pathway comprises, in the direction of heat transfer fluid flow, the second produced fluid heat exchanger then the first produced fluid heat exchanger.

4. The apparatus of claim 1 further comprising:
    an engine exhaust pathway that comprises an engine exhaust conduit fluidly connected to an engine exhaust heat exchanger, the engine exhaust heat exchanger fluidly connected to the heat transfer fluid pathway.

5. The apparatus of claim 4 further comprising an engine exhaust heat exchanger by-pass that is fluidly connected to the heat transfer fluid pathway.

6. The apparatus of claim 4, wherein the engine exhaust heat exchanger is a coil heat exchanger.

7. The apparatus of claim 1, wherein the at least one hydraulic heat exchanger includes a plurality of hydraulic heat exchangers, each fluidly connected to the heat transfer fluid pathway.

8. The apparatus of claim 7, wherein the heat transfer fluid pathway is fluidly connected to the plurality of hydraulic heat exchangers in parallel.

9. The apparatus of claim 1, wherein each of the at least one hydraulic heat exchanger is a plate and frame heat exchanger.

10. The apparatus of claim 1, wherein the engine coolant heat exchanger is a plate and frame heat exchanger.

11. The apparatus of claim 1, wherein the produced fluid heat exchanger is a shell and tube heat exchanger.

12. The apparatus of claim 1, wherein the produced fluid outlet is fluidly connected to a means for separating hydrocarbons from water.

13. A produced fluid heating apparatus comprising:
- a produced fluid pathway conveying a produced fluid, the produced fluid pathway extending from a produced fluid inlet to a produced fluid outlet;
- a heat transfer fluid pathway forming a closed loop, the heat transfer fluid pathway including a heat transfer pump to circulate a heat transfer fluid in the heat transfer fluid pathway;
- a produced fluid heat exchanger fluidly connected to the produced fluid pathway and the heat transfer fluid pathway, the produced fluid heat exchanger connected to the produced fluid pathway and the heat transfer fluid pathway to allow transfer of heat from the heat transfer fluid to the produced fluid; and
- a heat generation system including:
  - a diesel engine;
  - an engine coolant pathway including an engine coolant delivery conduit for conveying an engine coolant from the diesel engine and an engine coolant return conduit for conveying the engine coolant back to the diesel engine;
  - an engine coolant heat exchanger fluidly connected to the heat transfer fluid pathway, the engine coolant delivery conduit, and the engine coolant return conduit;
  - a heated hydraulic fluid pathway for conveying a hydraulic fluid, the heated hydraulic fluid pathway including a hydraulic pump driven by diesel engine; and
  - a hydraulic heat exchanger fluidly connected to the heat transfer fluid pathway and the heated hydraulic fluid pathway.

14. The apparatus of claim 13, wherein the engine coolant heat exchanger transfers thermal energy from the engine coolant to the heat transfer fluid, and the produced fluid heat exchanger transfers the thermal energy, which had been transferred to the heat transfer fluid, from the heat transfer fluid to the produced fluid.

15. The apparatus of claim 13, wherein the hydraulic heat exchanger transfers thermal energy from the hydraulic fluid to the heat transfer fluid, and the produced fluid heat exchanger transfers the thermal energy, which had been transferred to the heat transfer fluid, from the heat transfer fluid to the produced fluid.

16. The apparatus of claim 13, wherein the heat generation system further includes:
- an engine exhaust pathway that includes an engine exhaust conduit to convey a combustion exhaust from the diesel engine; and
- an engine exhaust heat exchanger fluidly connected to the heat transfer fluid pathway and the engine exhaust conduit, and the engine exhaust heat exchanger transfers thermal energy from the combustion exhaust to the heat transfer fluid, and the produced fluid heat exchanger transfer the thermal energy, which had been transferred to the heat transfer fluid, from the heat transfer fluid to the produced fluid.

17. The apparatus of claim 13, wherein the produced fluid outlet is fluidly connected to a means for separating hydrocarbons from the produced fluid.

* * * * *